(12) United States Patent
Angell et al.

(10) Patent No.: US 7,880,611 B2
(45) Date of Patent: Feb. 1, 2011

(54) QUALITATIVE/QUANTITATIVE ANALYSIS OF A MATERIAL USING RFIDS

(75) Inventors: Robert L. Angell, Salt Lake City, UT (US); James R. Kraemer, Santa Fe, NM (US)

(73) Assignee: International Business Machines Corporation, Armonk, NY (US)

( * ) Notice: Subject to any disclaimer, the term of this patent is extended or adjusted under 35 U.S.C. 154(b) by 327 days.

(21) Appl. No.: 12/043,296

(22) Filed: Mar. 6, 2008

(65) Prior Publication Data

US 2009/0224919 A1    Sep. 10, 2009

(51) Int. Cl.
*G08B 21/00*    (2006.01)

(52) U.S. Cl. ............... 340/540; 340/572.1; 340/10.1; 340/10.5

(58) Field of Classification Search ........... 340/572, 340/10, 505
See application file for complete search history.

(56) References Cited

U.S. PATENT DOCUMENTS

| | | | |
|---|---|---|---|
| 7,068,170 B2* | 6/2006 | Green | 340/572.1 |
| 2005/0212675 A1* | 9/2005 | Green | 340/572.8 |
| 2009/0224915 A1* | 9/2009 | Angell et al. | 340/572.1 |
| 2009/0224916 A1* | 9/2009 | Angell et al. | 340/572.1 |

\* cited by examiner

*Primary Examiner*—Travis R Hunnings
(74) *Attorney, Agent, or Firm*—Dillon & Yudell LLP

(57) ABSTRACT

Unpackaged bulk material is made up of components that have been laced with RFID tags. By interrogating the RFID tags, the different components are identified and quantified, thus providing a quick assay of the bulk material.

20 Claims, 6 Drawing Sheets

| MATERIAL A | COMPONENT 1 | 10% |
|---|---|---|
|  | COMPONENT 2 | 30% |
|  | COMPONENT 3 | 60% |
|  |  |  |
| MATERIAL B | COMPONENT 1 | 30% |
|  | COMPONENT 2 | 20% |
|  | COMPONENT 4 | 50% |

QUALITATIVE/QUANTITATIVE ANALYSIS OF A MATERIAL USING RFIDS

BACKGROUND OF THE INVENTION

1. Technical Field

The present disclosure relates to the field of materials, and specifically to the qualitative and quantitative analysis of materials. Still more particularly, the present disclosure relates to using analysis tags to identify components of a material.

2. Description of the Related Art

Identifying unpackaged bulk material is difficult, since many different types of bulk material look, feel and smell alike. Thus, without the labeling that accompanies packaging, accurate identification of the material requires a qualitative and quantitative analysis of the material. The qualitative analysis identifies what components are in the bulk material, and the quantitative analysis measures (weights, counts, gives a percentage, etc.) how much of each component is found in the bulk material. Such analysis typically requires complex technical methodology, which may include the use of equipment such as a Mass Spectrometer/Gas Chromatograph (MS/GC). This type of equipment is expensive, non-portable, and must be operated by highly-trained technicians.

SUMMARY OF THE INVENTION

Unpackaged bulk material is made up of components that have been laced with RFID tags. By interrogating the RFID tags, the different components are identified and quantified, thus providing a quick assay of the bulk material.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

FIG. 8 is an exemplary table that may be used to identify a material according to known component percentages.

DETAILED DESCRIPTION OF THE PREFERRED EMBODIMENT

Figure 1:
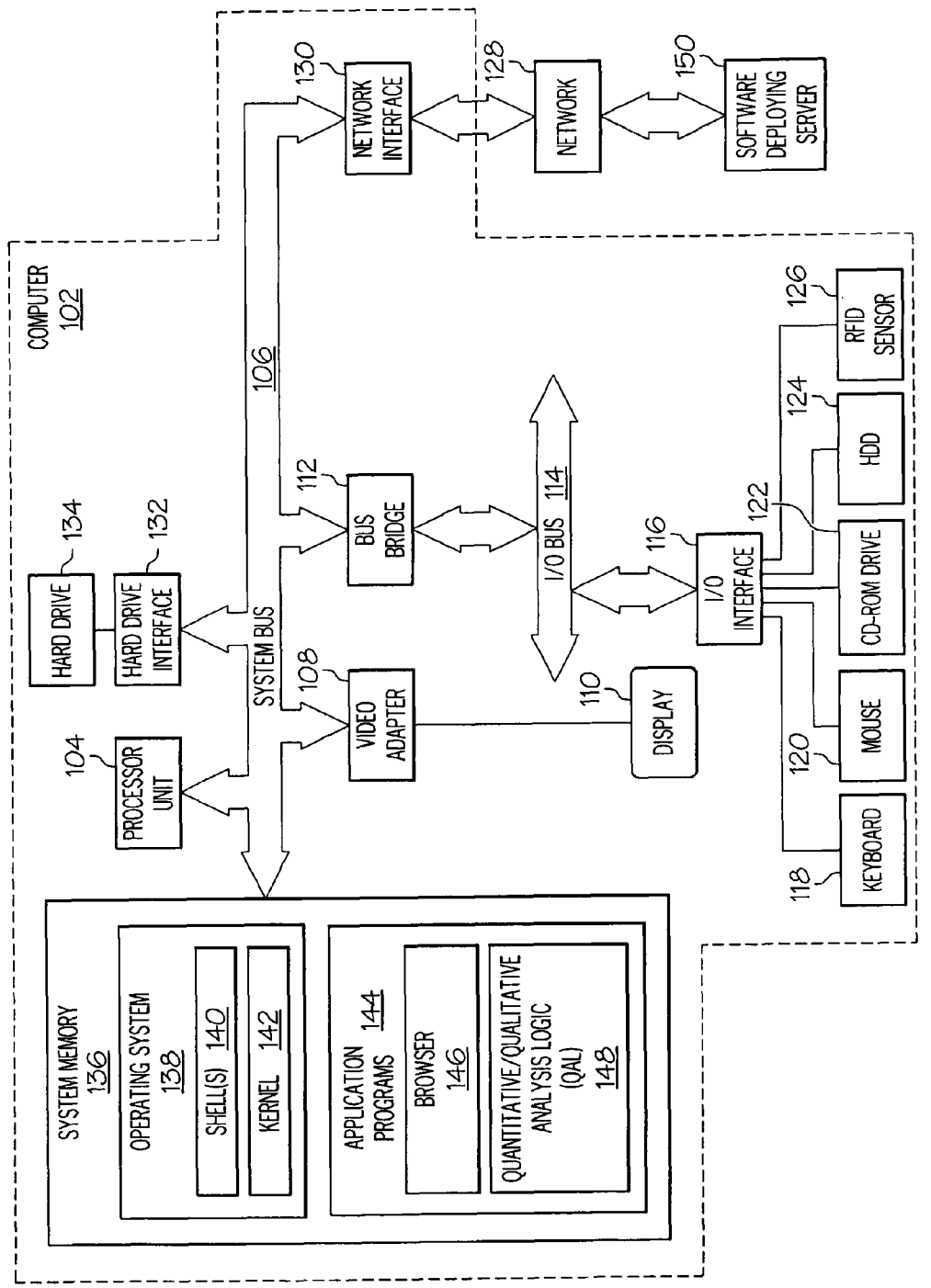
FIG. 1 depicts an exemplary computer which may be utilized by the present invention.

With reference now to the figures, and in particular to FIG. 1, there is depicted a block diagram of an exemplary computer 102, which the present invention may utilize. Note that some or all of the exemplary architecture shown for computer 102 may be utilized by software deploying server 150.

Computer 102 includes a processor unit 104, which may utilize one or more processors each having one or more processor cores, that is coupled to a system bus 106. A video adapter 108, which drives/supports a display 110, is also coupled to system bus 106. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, a Radio Frequency (RF) transmitter 122, a Hard Disk Drive (HDD) 124, and a Radio Frequency Identification (RFID) sensor 126. It is recognized that RF transmitter 122 and RFID sensor 126 should be protected from one another, by distance or a shield (not shown), in order to enable proper functionality of the RFID sensor 126. The format of the ports connected to I/O interface 116 may be any known to those skilled in the art of computer architecture, including but not limited to Universal Serial Bus (USB) ports.

Computer 102 is able to communicate with a software deploying server 150 via a network 128 using a network interface 130, which is coupled to system bus 106. Network 128 may be an external network such as the Internet, or an internal network such as an Ethernet or a Virtual Private Network (VPN).

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a World Wide Web (WWW) client (i.e., computer 102) to send and receive network messages to the Internet using HyperText Transfer Protocol (HTTP) messaging, thus enabling communication with software deploying server 150 and other described computer systems.

Application programs 144 in computer 102's system memory (as well as software deploying server 150's system memory) also include a Qualitative/Quantitative Analysis Logic (QQAL) 148. QQAL 148 includes code for implementing the processes described below, and particularly as described in FIGS. 4-8. In one embodiment, computer 102 is able to download QQAL 148 from software deploying server 150, including in an on-demand basis. Note further that, in one embodiment of the present invention, software deploying server 150 performs all of the functions associated with the present invention (including execution of QQAL 148), thus freeing computer 102 from having to use its own internal computing resources to execute QQAL 148.

The hardware elements depicted in computer 102 are not intended to be exhaustive, but rather are representative to highlight essential components required by the present invention. For instance, computer 102 may include alternate memory storage devices such as magnetic cassettes, Digital Versatile Disks (DVDs), Bernoulli cartridges, and the like. These and other variations are intended to be within the spirit and scope of the present invention.

In an exemplary embodiment, the present invention utilizes Radio Frequency Identification (RFID) tags to identify (qualify) and measure (quantify) component percentages in a material. That is, the present invention performs an analysis of a material, either known or unknown, that identifies the ratio (or percentage or quantity) of the different components in the material. As known to those skilled in the art, an RFID tag may be active (i.e., battery powered), semi-passive (i.e., powered by a battery and a capacitor that is charged by an RF interrogation signal), or purely passive (i.e., either have a capacitor that is charged by an RF interrogation signal or are geometrically shaped to reflect back specific portions of the RF interrogation signal). Passive RFID tags may contain an on-board Integrated Circuit (IC) chip, or they may be chipless.

Figure 2:
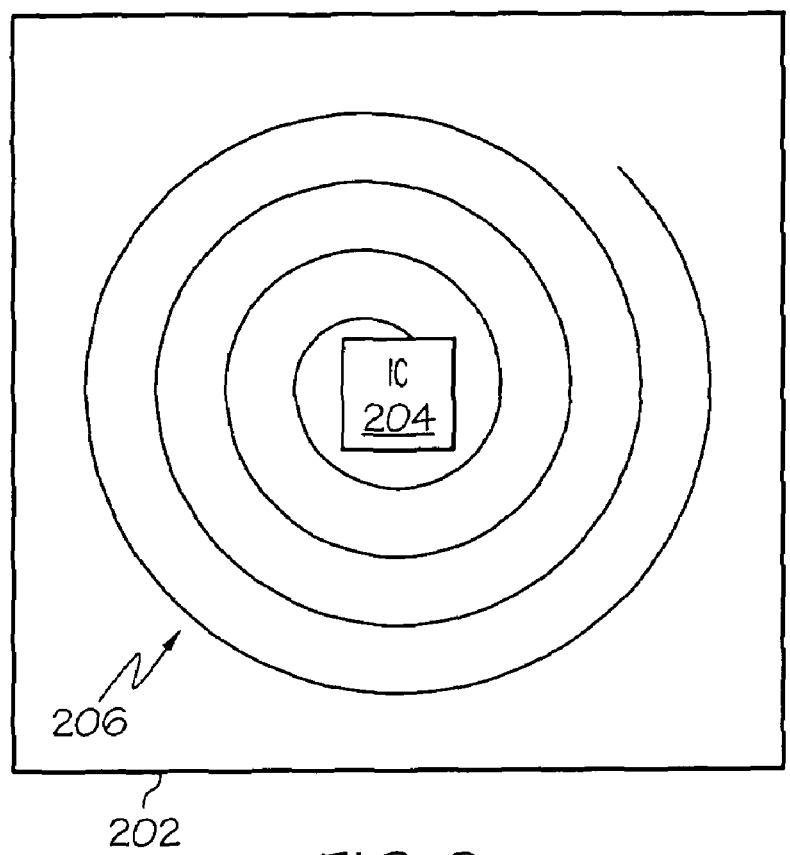
FIG. 2 illustrates an exemplary chip-enabled Radio Frequency Identification (RFID) tag, which may be utilized to identify a component of a material.

Referring now to FIG. 2, an exemplary RFID tag 202 having an on-board IC chip is made up of two components: the IC chip 204 and a coupled antenna 206. The IC chip 204 stores and processes information, including Electronic Product Code (EPC) information that describes a component of a material that is laced with RFID tags (i.e., a "laced material"). This description may include, but is not limited to: the component's name; the component's chemical composition (if a the component is a chemical or a chemical compound); the component's manufacturer's name; emergency information (including emergency contact information at the manufacture's facility, Material Safety Data Sheet (MSDS) information that includes emergency (fire, spill, etc.) and health (personal protective equipment requirements, Short Tenn Exposure Limit (STEL), Threshold Limit Values (TLV), etc.)) for the component; etc. The IC chip 204 may contain a low-power source (e.g., a capacitor, not shown, that is charged by an interrogation signal received by the coupled antenna). Upon the capacitor being charged, the IC chip 204 then generates a radio signal, which includes the EPC information, to be broadcast by the coupled antenna 206.

Figure 3:
FIG. 3 depicts an exemplary chipless RFID tag, which may be utilized to identify a component of the material.

Referring now to FIG. 3, an exemplary chipless RFID tag 302 is illustrated. As the name implies, chipless RFID tag 302 does not have an IC chip, but is only an antenna that is shaped to reflect back a portion of an interrogation RF signal. That is, the chipless RFID tag 302 (also known as a Radio Frequency (RF) fiber) is physically shaped to reflect back select portions of a radio interrogation signal from an RF transmission source. Chipless RFID tag 302 typically has a much shorter range than an RFID chip that includes an on-board IC chip, such as RFID tag 202. Furthermore, the amount of information that chipless RFID tag 202 can store and return is much smaller than that of RFID tag 202 with its on-board IC chip.

Figure 4:
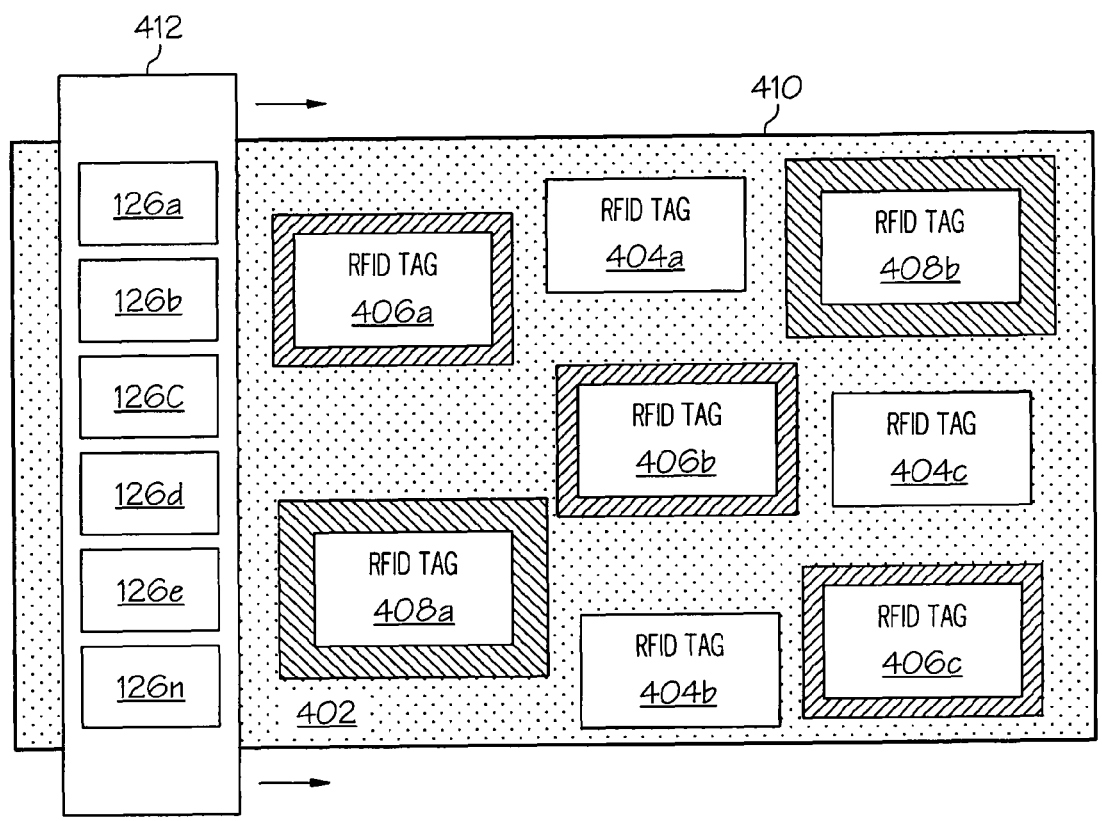
FIG. 4 illustrates an RFID sensor panel for interrogating RFID tags that lace unpackaged material.

With reference now to FIG. 4, an exemplary use of RFID tags to identify components in a material, including an unpackaged (bulk) material, is presented. Assume that material 402 is bulk material, but whose composition is either unknown, or needs to be confirmed. Also assume that material 402 is made up of three components, which are each respectively identified by RFID tags 404*a-c*, RFID tags 406*a-c*, and RFID tags 408*a-b*.

Regarding the RFID tags and their distribution, note the following. First, in one embodiment, each component material 402 is laced with a same number of RFID tags per unit of material. For example, each component may be laced with twenty RFID tags per liter (solid or liquid) of the component, which are preferably uniformly distributed. Thus, by detecting and counting the different types of RFID tags, a gross analysis (identification of types and quantities/ratios/percentages of components) of the material can be performed by determining how much of each component is found in the material.

Second, the multiple RFID tags 404, 406, 408 are not adhered to the bulk material 602, but rather are suspended within the bulk material 402 in a colloidal state.

Third, note also that the RFID tags 404, 406, 408 are not shown to scale. That is, the RFID tags 404, 406, 408 are preferably small (i.e., less than 0.5 mm×0.5 mm), in order to allow them to flow freely and without clogging piping.

Fourth, the number of types of RFID tags may be one or more, and three (404, 406, 408) sets are only shown for exemplary purposes.

As noted above, the RFID tags 404, 406, 408 should remain uniformly mixed throughout the bulk material 402. If the bulk material 402 is a dry particulate matter (e.g., GMOs such as grain), then the RFID tags 404, 406, 408 will naturally remain in a dispersed orientation. However, if the bulk material 402 is a liquid (e.g., an emulsion of GMO grain), then a buoyancy coating may need to be applied around the RFID tags 404, 406, 408, in order to give them a same specific gravity as the bulk material 402.

Continuing to reference FIG. 4, assume that the (unpackaged) bulk material 402 needs to be assayed. One method for doing so involves pouring a sample of the bulk material 402 onto a tray 410. Tray 410 may be of any arbitrarily selected width and length, but should be shallow enough to permit interrogation of any RFID tags 404, 406, 408 in the bulk material 402. Thereafter, an RFID sensor panel 412 may be moved across (and above) the tray 410 to interrogate the RFID tags 404, 406, 408. Note that the RFID sensor panel 412 includes multiple RFID sensors 126*a-n* (where "n" is an integer). RFID sensors 126*a-n* are analogous to the RFID sensor 126 described above in FIG. 1, and are coupled to a computer (not shown) such as computer 102 shown in FIG. 1. Thus, RFID sensors 126*a-n* are used to identify and count the different RFID tags 404, 406, 408 in the bulk material 402, thus providing a qualitative (identifying the different components) analysis of the bulk material 402 and a quantitative (measuring the amounts of the different components) analysis of the bulk material 402.

Figure 5:
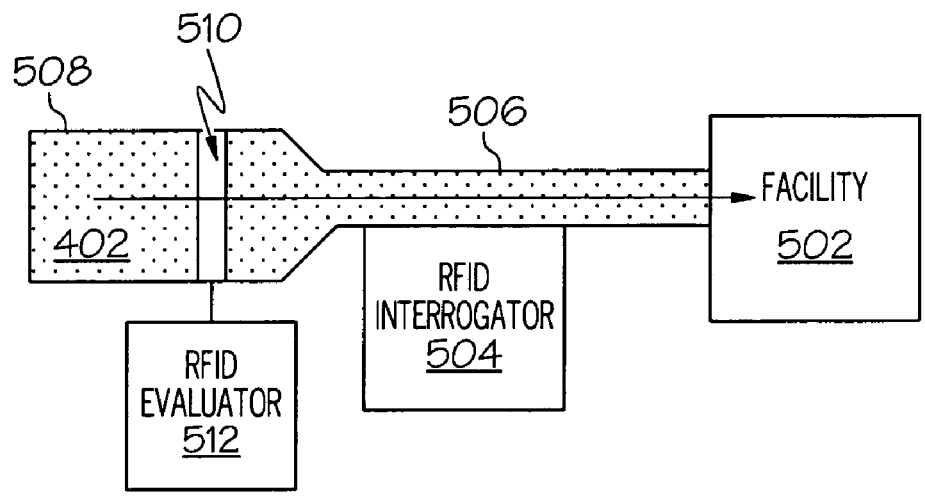
FIG. 5 depicts a tapered inlet line used to enable detection of RFID tags in a pipeline.
Figure 6:
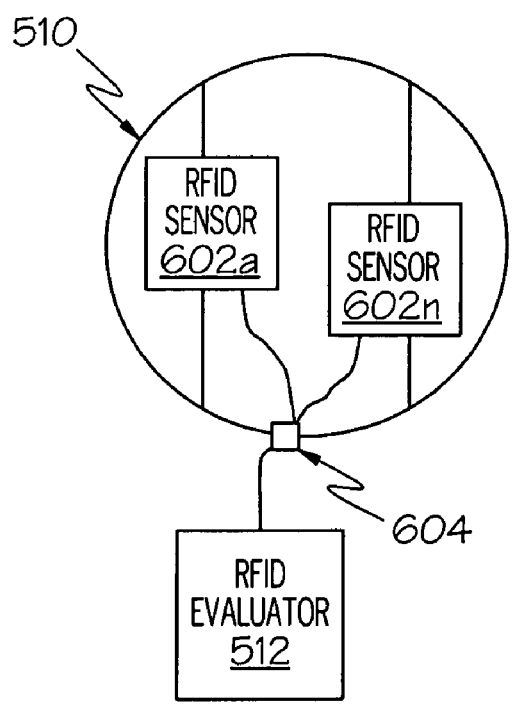
FIG. 6 illustrates detail of a grid, with attached RFID sensors, which is internal to a pipeline shown in FIG. 5.

Referring now to FIG. 5, another method for assaying the bulk material 402 is presented. Assume that the bulk material 402 (still unpackaged and laced with the RFID tags 404, 406, 408 shown in FIG. 4, but not shown in FIG. 5) is entering a facility 502 (i.e., a chemical plant, a manufacturing facility, a storage facility, etc.) through piping 506. As the bulk material 402 passes through the narrowed piping 506, the RFID tags 404, 406, 408 are detected by an RFID interrogator 504.

RFID interrogator 504 utilizes an architecture substantially described in FIG. 1 for computer 102. That is, RFID interrogator 504 includes an RF transmitter 122 and at least one RFID sensor 126, which interrogates the passing RFID tags 404, 406, 408 as they enter the facility 502. This interrogation is accomplished by transmitting an RF interrogation signal from an RF transmitter (e.g., RF transmitter 122 shown in FIG. 1) in the RFID interrogator 504 to the RFID tags 404, 406, 408, which then respond (to RFID sensor 126 shown in FIG. 1) with ID data for the bulk material 402. Note that RFID interrogator 504 is positioned against piping 506, which has been narrowed (tapered, necked) down from piping 508. That is, piping 508 is so large in diameter that RFID tags 404, 406, 408 in the middle of the inlet piping 508 would be unable to be "heard" by the RFID interrogator 504 if RFID interrogator 504 were placed next to the larger diameter piping 508.

Another solution to detecting all RFID tags 404, 406, 408 is presented by grid 510 and RFID evaluator 512. Grid 510 is a (rigid, semi-rigid or flexible) grid that is mounted within piping 508 in a traverse manner (i.e., where the face of the grid 510 is perpendicular to the flow of the bulk material 402). The grid 510 is preferably made of material that is both impervious (non-reactive, non-corrosive, etc.) to the bulk material 402, and also poses no electrical interference (including RF shielding) to the RFID tags 404, 406, 408. Mounted on the grid 510 are multiple RFID sensors 602a-n (shown in FIG. 6, where "n" is an integer), which are coupled via a sealed coupler 604 (that permits power and data communication to flow between the RFID sensors 602a-n and an RFID evaluator 512 without allowing the bulk material 402 to escape the piping 508) to RFID evaluator 512. The RFID evaluator 512 is substantially similar to the architecture shown in FIG. 1 for computer 102, except that the RFID sensors 602a-n (analogous to RFID sensor 126 shown in FIG. 1) are external to the computer 102.

Figure 7:
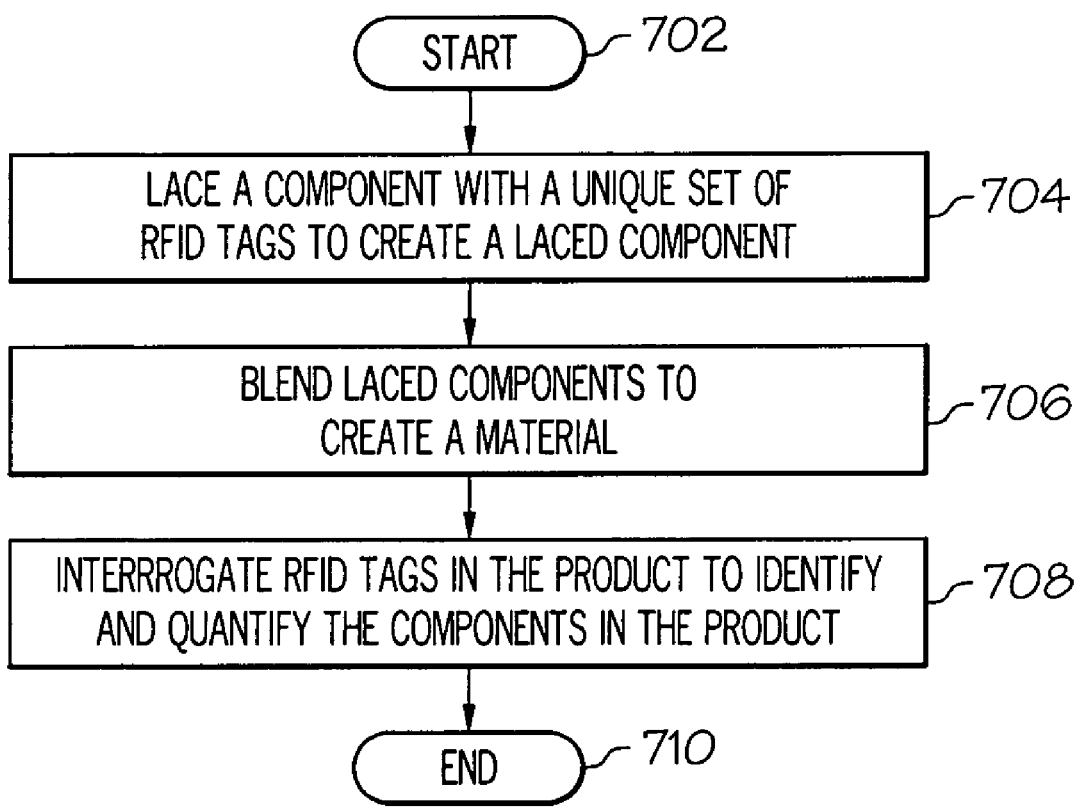
FIG. 7 is a high-level flow-chart of exemplary steps taken to determine a composition makeup of a material.

With reference now to FIG. 7, a high-level flow-chart of exemplary steps taken to determine a composition of a material is presented. After initiator block 702, each component (destined to become part of a material) is laced with a unique set of RFID tags (block 704). As described above, the RFID tags may contain as much detailed information about the component as is technically feasible, but must at least contain an identification of "what" the component is, even if that identification is nothing more than a coded signature, a brand name, etc. The different laced components are then blended to create a material (block 706). This "blending" may be a simple stirring operation to create an emulsion, mixture, solution, solid, etc. That is, any process that does not destroy (e.g., through excessive heat, chemical exposure, etc.) the functionality of the RFID tags may be used to create a material that is identifiable according to its components, through the use of RFID tags as described herein.

Thus, the material is now ready to be identified according to how many RFID tags, of one or more type, are detected in the material (block 708). As described above, if it is assumed that each component originally had a same number of RFID tags (unique for that component) per unit of volume (or weight), then the material can be assayed by counting how many of each type of RFID tag is found in a specific sample volume/weight of the material. For example, assume that interrogating the RFID tags in a sample reveals that the sample has 100 RFID tags in the sample, and that 10 of the RFID tags are of a first type (e.g., have a first digital signature), 30 of the RFID tags are of a second type, and 60 of the RFID tags are of a third type. By assuming that 1) each type (set) of RFID tag is associated with a specific component, and 2) that each set of RFID tags is uniformly distributed throughout its associated component (and thus the material), and 3) each of the components has a similar density, then reference can be made to a table, such as table 802 shown in FIG. 8, to identify the material. That is, by comparing the percentages/ratios of the different types of RFID tags detected in the material with the component ratios shown in table 802, a determination can be made that the material whose composition is 10% Component 1, 30% Component 2, and 60% Component 3, is a material identified as "Material A." If, however, 30% of the RFID tags were of the first type, 20% were of the second type, and 50% were of a fourth type, then the RFID-laced material would be identified as "Material B."

The process ends at terminator block 710.

Note that the method described herein may be to assay an unknown or known material. Thus, if the material is unknown, the RFID tags provide a quick assay method to identify what components make up the material, and thus what the overall material itself is. This may be particularly useful for emergency responders, who need a quick method for identifying (using a portable version of computer 102 shown in FIG. 1) a spill, etc. If the material is a purportedly known material, however, the method described herein may be used as a quality control method, in order to confirm that the material is what it is purported to be, and having the percentage of components represented by the supplier of the material. Note again that the RFID tags may identify a manufacturer, lot number, date of manufacture, chemical composition and emergency procedure information for each of the components in the laced material, plus any other information deemed significant by the supplier/manufacturer of the components.

Note also that the method described herein may be utilized to identify an entire composition of material (in which all components are RFID-laced), or the method may be used to identify part of a material. For example, assume that a material is a tanker of gasoline with detergent additives. The method may be used to only identify the type of additives in the gasoline, without concern as to the makeup of the gasoline itself.

It should be understood that at least some aspects of the present invention may alternatively be implemented in a computer-readable medium that contains a program product. Programs defining functions of the present invention can be delivered to a data storage system or a computer system via a variety of tangible signal-bearing media, which include, without limitation, non-writable storage media (e.g., CD-ROM), writable storage media (e.g., hard disk drive, read/write CD ROM, optical media), as well as non-tangible communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

While the present invention has been particularly shown and described with reference to a preferred embodiment, it will be understood by those skilled in the art that various changes in form and detail may be made therein without departing from the spirit and scope of the invention. For example, while the present description has been directed to a preferred embodiment in which custom software applications are developed, the invention disclosed herein is equally applicable to the development and modification of application software. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

What is claimed is:

1. A method of determining a composition of a material, the method comprising:
    receiving a material that is laced with multiple sets of Radio Frequency Identification (RFID) tags to form a laced material, wherein each set of RFID tags identifies a different component of the laced material;
    interrogating the RFID tags with an RF interrogation signal; and
    receiving identification signals from each set of RFID tags, wherein the identification signals identify different components of the tagged material to determine a composition of the laced material.

2. The method of claim 1, wherein the RFID tags are suspended unattached to the laced material to form a colloidal state.

3. A method of determining a composition of a material, the method comprising:
    receiving a material that is laced with at least one set of Radio Frequency Identification (RFID) tags to form a laced material, wherein each set of RFID tags identifies a different component of the laced material;
    interrogating the RFID tags with an RF interrogation signal;
    receiving identification signals from each set of RFID tags, wherein the identification signals identify different components of the tagged material to determine a composition of the laced material; and
    determining a ratio of identification signals, wherein the ratio of identification signals reflects a relative composition percentage of each different component of the laced material.

4. The method of claim 3, further comprising:
    comparing the relative composition percentage of each different component with a known table, wherein the known table provides a relative composition percentage of each component of a known material.

5. The method of claim 4, wherein the laced material is an unknown material, and wherein the comparing identifies a makeup of the unknown material.

6. The method of claim 4, wherein the laced material is a purportedly known material, and wherein the comparing confirms a quality and makeup of the purportedly known material.

7. The method of claim 6, wherein the RFID tags identify a manufacturer, lot number, date of manufacture, chemical composition and emergency procedure information for each of the components in the laced material.

8. The method of claim 1, wherein the laced material is composed of only laced components that have been laced with RFID tags.

9. A method of determining a composition of a material, the method comprising:
    receiving a material that is laced with at least one set of Radio Frequency Identification (RFID) tags to form a laced material, wherein each set of RFID tags identifies a different component of the laced material;
    interrogating the RFID tags with an RF interrogation signal; and
    receiving identification signals from each set of RFID tags, wherein the identification signals identify different components of the tagged material to determine a composition of the laced material;
    wherein receiving identification signals is performed by a grid of RFID sensors that are internal to a pipeline.

10. A method of identifying material, the method comprising:
    lacing each of multiple different components of a material with multiple different sets of Radio Frequency Identification (RFID) tags to form a laced material, wherein each set of RFID tags identifies a different component of the laced material, and wherein, when interrogated, the RFID tags are able to identify components of the tagged material to determine a composition of the laced material, such that the composition identifies the laced material.

11. The method of claim 10, wherein the RFID tags are suspended unattached to the laced material to form a colloidal state.

12. A system for identifying unpackaged material, the system comprising:
    a Radio Frequency (RF) transmitter for interrogating sets of Radio Frequency Identification (RFID) tags that are laced in unpackaged material, wherein each set of RFID tags identifies a different component of the unpackaged material; and
    a Radio Frequency Identification (RFID) sensor for receiving identification signals from each set of RFID tags, wherein the identification signals identify components of the unpackaged material to determine a composition of the unpackaged material.

13. The system of claim 12, wherein the RFID tags are suspended unattached to the laced material to form a colloidal state.

14. A non-transitory computer-readable medium for storing computer program code, the computer program code comprising instructions executable by a processor and configured for determining a composition of a material by performing the steps of:
    receiving a material that is laced with multiple sets of Radio Frequency Identification (RFID) tags to form a laced material, wherein each set of RFID tags identifies a different component of the laced material;
    interrogating the RFID tags with an RF interrogation signal; and
    receiving identification signals from each set of RFID tags, wherein the identification signals identify components of the tagged material to determine a composition of the laced material.

15. The non-transitory computer-readable medium of claim 14, wherein the RFID tags are suspended unattached to the laced material to form a colloidal state.

16. A non-transitory computer-readable medium for storing computer program code, the computer program code comprising instructions executable by a processor and configured for determining a composition of a material by performing the steps of:
    receiving a material that is laced with at least one set of Radio Frequency Identification (RFID) tags to form a laced material, wherein each set of RFID tags identifies a different component of the laced material;
    interrogating the RFID tags with an RF interrogation signal;

receiving identification signals from each set of RFID tags, wherein the identification signals identify components of the tagged material to determine a composition of the laced material; and determining a ratio of identification signals, wherein the ratio of identification signals reflects a relative composition percentage of each different component of the laced material.

17. The non-transitory computer-readable medium of claim 16, wherein the instructions are further configured for:

comparing the relative composition percentage of each different component with a known table, wherein the known table provides a relative composition percentage of each component in a known material.

18. The non-transitory computer-readable medium of claim 17, wherein the laced material is an unknown material, and wherein the comparing identifies a makeup of the unknown material.

19. The non-transitory computer-readable medium of claim 14, wherein the computer-usable medium is a component of a remote server, and wherein the computer executable instructions are deployable to a supervisory computer from the remote server.

20. The non-transitory computer-readable medium of claim 14, wherein the computer executable instructions are capable of being provided by a service provider to a customer on an on-demand basis.

* * * * *